United States Patent
Bortnikov et al.

(10) Patent No.: US 11,341,119 B2
(45) Date of Patent: May 24, 2022

(54) SYSTEMS, DEVICES, AND METHODS FOR CONTENT INDEXING AND QUERYING IN A SEARCH SYSTEM

(71) Applicant: VERIZON PATENT AND LICENSING INC., Basking Ridge, NJ (US)

(72) Inventors: Edward Bortnikov, Haifa (IL); Ohad Shacham, Kfar Monash (IL); Dmitry Basin, Petah Tikva (IL); Gali Sheffi, Kiryat Bialik (IL); Yonatan Gottesman, Haifa (IL)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/991,452

(22) Filed: Aug. 12, 2020

(65) Prior Publication Data

US 2020/0372011 A1    Nov. 26, 2020

Related U.S. Application Data

(63) Continuation of application No. 15/787,804, filed on Oct. 19, 2017, now Pat. No. 10,747,750.

(51) Int. Cl.
| | |
|---|---|
| *G06F 16/23* | (2019.01) |
| *G06F 16/93* | (2019.01) |
| *G06F 16/248* | (2019.01) |
| *G06F 16/22* | (2019.01) |
| *G06F 16/9535* | (2019.01) |
| *G06F 16/2457* | (2019.01) |

(52) U.S. Cl.
CPC ...... *G06F 16/2365* (2019.01); *G06F 16/2228* (2019.01); *G06F 16/248* (2019.01); *G06F 16/24575* (2019.01); *G06F 16/93* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 9,262,384 | B2* | 2/2016 | Davis | G06F 16/94 |
| 10,108,688 | B2* | 10/2018 | Busch | G06F 16/27 |
| 10,223,050 | B2* | 3/2019 | Krishnasamy | G06F 3/128 |
| 10,223,051 | B2* | 3/2019 | Krishnasamy | G06F 3/1254 |
| 10,235,459 | B1* | 3/2019 | Mackintosh | G06F 16/9574 |
| 10,289,456 | B2* | 5/2019 | Erickson | G06F 9/52 |
| 10,339,183 | B2* | 7/2019 | Kohlmeier | G06F 16/93 |
| 10,366,376 | B2* | 7/2019 | Sherman | G06Q 20/28 |
| 2009/0259664 | A1* | 10/2009 | Murthy | G06F 16/148 |
| 2020/0372011 | A1* | 11/2020 | Bortnikov | G06F 16/2228 |

* cited by examiner

*Primary Examiner* — Kim T Nguyen

(57) ABSTRACT

Systems and methods for indexing content in a personal search system are disclosed. In one embodiment, the method comprises receiving a content item from a data source; extracting, from the content item, at least one document appearing in the content item, the at least one document including a first timestamp; storing the document in a content index; retrieving an event associated with the document from an event index, the event including a second timestamp and one or more attributes; generating an updated document based on the one or more attributes, the updated document including the second timestamp and the one or more attributes; and replacing the document stored in the content index with the updated document if the second timestamp is later than the first timestamp.

17 Claims, 11 Drawing Sheets

SYSTEMS, DEVICES, AND METHODS FOR CONTENT INDEXING AND QUERYING IN A SEARCH SYSTEM

CROSS-REFERENCE TO RELATED APPLICATIONS

This application claims the benefit of and is a continuation of U.S. patent application Ser. No. 15/787,804, filed Oct. 19, 2017, titled "SYSTEMS, DEVICES, AND METHODS FOR CONTENT INDEXING AND QUERYING IN A SEARCH SYSTEM", which is incorporated by reference herein in its entirety.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever

BACKGROUND

The disclosure relates to the fields of search engines and content indexing and, in particular, to methods, devices, and systems for high-throughput indexing and ad hoc query activation.

With increased user activity with networked applications (e.g., websites or services), more complex systems were built and, accordingly, an increasing amount of data has been, and continues to be, generated. For example, web-based mail applications generate vast amounts of contents as millions of users create messages, send attachments, and perform other operations. Similarly, other user applications can result in terabytes (or more) of data being stored and associated with users.

In parallel with this trend, search engines have become more and more advanced and necessary as the amount of data increases. Generally, search engines are focused on crawling the Internet and creating an index of content for future keyword searches. In time, this methodology was applied to user-facing applications. For example, users may now search electronic mail using keywords or search social networks using keywords.

Despite advances in search engines, the addition of search engine technology to user-focused platforms suffers from numerous technical problems. First, existing search indexing techniques are unable to cope efficiently with historical data and out-of-order data. That is, content such as mail is indexed at one time, as it is received. Future content is simply added to the existing indexed data. While this approach may work for a mail provider—since the mail provider has no concept of history (as used herein)—it surfaces problems in extending the capabilities of the system. Specifically, when mail providers attempt to add new technical features, the existing mail must be completely re-indexed (or the current index relied upon) until the features are available for public use. Thus, new features cannot be deployed quickly.

Additionally, current systems are unable to reliably present content while such content is undergoing processing. Specifically, due to the out-of-order nature of event processing, current systems often display "stale" data (e.g., documents that have been deleted). This arises due to the fact that a race condition may occur wherein current systems first process a document but only later process a deletion event (or similar event). Thus, current systems present inconsistent views of a data source to a user. Moreover, current systems often present duplicated data since data from multiple sources is not reconciled in a consistent manner with events associated with documents from those sources.

BRIEF SUMMARY

Disclosed herein are systems, devices, and methods for indexing content in a personal search system remedying the above deficiencies.

Existing systems suffer from numerous deficiencies in indexing data that include both historical and fresh data. Specifically, current search engines are unable to distinguish between historical data and fresh data; rather all data is fresh data (e.g., crawl data). Additionally, current systems are unable to maintain consistency when historical data is updated by real-time events. Moreover, current systems are unable to simultaneously index historical, and real-time data and race conditions frequently occur in existing systems. Finally, existing systems are unable to re-index content on an on-demand basis. This is because these systems can only serve user queries when the entire data set is indexed. Thus, if a new feature requiring a specific, new index is required, all data must be completely indexed before search queries using the new index can be handled. To solve this problem, the embodiments use a separate event index to maintain the correctness of the documents and derived documents. As described in detail herein, the use of a separate index, along with specific indexing procedures enables a system to index historical data and fresh data in parallel, while allowing for user queries to be uninterrupted (even during re-indexing operations).

In general, the disclosed embodiments receive content items from data sources and index documents or derived documents included within the content items. The embodiments receive data in an arbitrary fashion. On the one hand, historical data (e.g., data existing prior to indexing) is received in batch form. On the other hand, fresh or real-time data (e.g., data received after indexing was started) is received on a rolling basis. In addition to content items, the embodiments receive events related to the documents (e.g., deletions, updates, etc.). The data in either form (historical or fresh) and the events may refer to the same underlying documents (e.g., email). Since data is potentially received out-of-order, race conditions may occur wherein a document or derived document is deleted before it is indexed, resulting in deleted content being indexed.

The embodiments additionally receive search queries at any point during the indexing operations. Since some data may not yet be indexed, the embodiments disclose techniques for managing the scope of searches and guaranteeing a consistent view of data to the user. In this manner, the embodiments allow for instant activation of new search experiences (e.g., searches for newly defined derived document types) even while indexing is ongoing, thus allowing for rapid deployment of new search types.

In one embodiment, the method comprises receiving a content item from a data source; extracting, from the content item, at least one document appearing in the content item, the at least one document including a first timestamp; storing the document in a content index; retrieving an event associated with the document from an event index, the event including a second timestamp and one or more attributes; generating an updated document based on the one or more attributes, the updated document including the second timestamp and the one or more attributes; and replacing the document stored in the content index with the updated document if the second timestamp is later than the first timestamp In one embodiment, a system is disclosed comprising one or more data sources; a content index configured to store documents; an event index configured to store events associated with documents stored in the content index; and a processing device configured to: receive a content item from the one or more data sources; extract, from the content item, at least one document appearing in the content item, the at least one document including a first timestamp; store the document in the content index; retrieve an event associated with the document from the event index, the event including a second timestamp and one or more attributes; generate an updated document based on the one or more attributes, the updated document including the second timestamp and the one or more attributes; and replace the document stored in the content index with the updated document if the second timestamp is later than the first timestamp.

A device comprising: a processor; and a non-transitory memory storing computer-executable instructions therein that, when executed by the processor, cause the device to: receive a content item from one or more data sources, extract, from the content item, at least one document appearing in the content item, the at least one document including a first timestamp, store the document in a content index, retrieve an event associated with the document from an event index, the event including a second timestamp and one or more attributes, generate an updated document based on the one or more attributes, the updated document including the second timestamp and the one or more attributes, and replace the document stored in the content index with the updated document if the second timestamp is later than the first timestamp.

BRIEF DESCRIPTION OF THE FIGURES

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
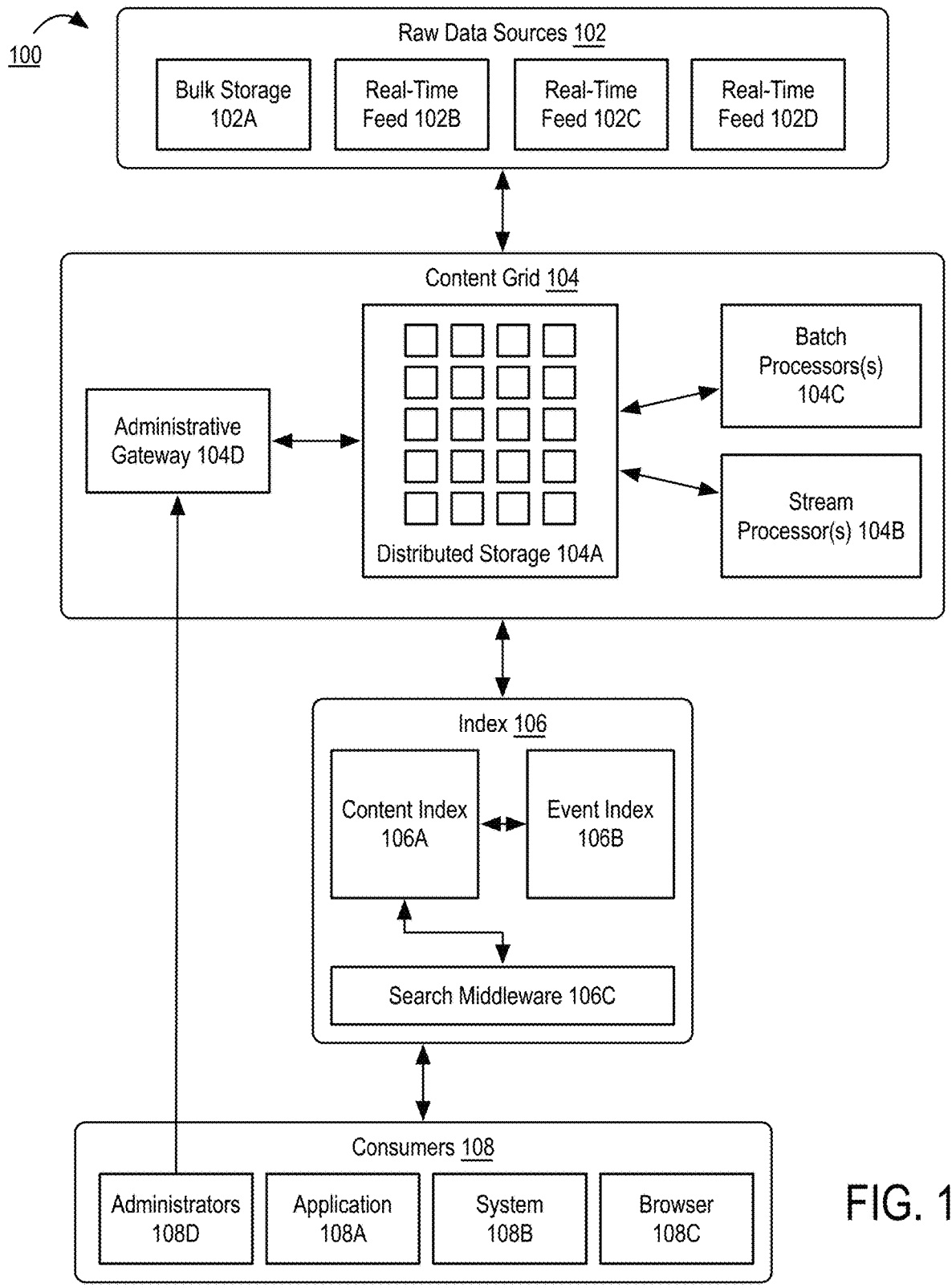
FIG. 1 is a block diagram illustrating a personal search system according to some embodiments of the disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

FIG. 1 is a block diagram illustrating a personal search system according to some embodiments of the disclosure.

System 100 includes a plurality of raw data sources 102. In one embodiment, a raw data source comprises a remote or local data source storing documents. The form of a document varies depending on the underlying raw data source. As used herein, documents, prior to processing, may comprise email messages, shared documents, photos, social media content, and any other quantifiable unit of content capable of being shared over a network.

In some embodiments, raw data sources 102 comprise "internal" data sources. That is, raw data sources 102 can comprise data sources owned or operated by the owner or operator of the system 100. In other embodiments, raw data sources 102 include external data sources. For example, a given raw data source may comprise a social networking system or photo sharing system that provides an API for accessing social media data or photo stream data, respectively.

In some embodiments, a raw data source may comprise a database. In other embodiments, a raw data source may comprise an entire system in its own right. For example, a raw data source may comprise social media system or photo sharing website, both of which may provide many other functions but may provide a remote API for accessing the underlying content.

Raw data sources 102 include bulk storage 102A and real-time feeds 102B-D. Although illustrated as a specific number of data sources, no limitation is placed on the number and type of data sources.

In one embodiment, bulk storage 102A corresponds to a data source that logically represents historical data as measured from a given point in time. As will described herein, the given point in time may comprise the time the system is activated. Alternatively, or in conjunction with the foregoing, the given point of time may correspond to the time a new derived document is created. As used herein a derived document refers to a portion of a document that is independently meaningful. For example, an email message may comprise a document. An attachment to the email, while part of the email, comprises a derived document. As used herein, the term "document" refers to either a document or a derived document within a document, when the distinction is not necessary.

Real-time data feeds 102B-102D comprise data feeds that continuously provide updated data. In one embodiment, real-time data feeds 102B-102D comprise an API to an external system that may continuously be queried for new data or events. As used herein, the terms "real-time" and "fresh" are used interchangeably to refer to data received after the given point in time discussed above.

While the system 100 illustrates bulk storage 102A and real-time data feeds 102B-102D as separate feeds, in practice the storage 102 and feeds 102B-102D may be combined. For example, an email service provider may provide a single API endpoint to access data. During processing, the system 100 may process data from the endpoint according to two data paths. First, the system may periodically query the API to receive the most recent content. Second, the system may periodically query to retrieve batches of historical data. Thus, logically the system 100 represents these two data paths as bulk storage and real-time data feeds.

Raw data sources 102 are communicatively coupled to content grid 104. In the illustrated embodiment, content grid 104 stores documents received from raw data sources 102 and derived documents extracted from processing documents. In one embodiment, content grid comprises a cloud-based, big data platform and thus may comprise many commodity hardware devices working in unison, potentially over large distances.

At the core of content grid 104 is a distributed storage system 104A. In one embodiment, distributed storage system 104A comprises a highly distributed data source. As described above, distributed storage system 104A may comprise a large number of commodity storage devices. In one embodiment, a distributed file system such as the HADOOP file system (HDFS) may be utilized, although the system is not limited to a specific file system.

The primary role of the distributed storage system 104A is to store documents and derived documents generated as the result of processing documents. In the illustrated embodiment, documents received from raw data sources 102 are processed by batch processors 104C and stream processors 104B to parse documents or generate derived documents stored in distributed storage system 104A.

Both processors 104B and 104C receive documents from raw data sources 102. Processors 104B and 104C process the documents and store the content (e.g., parsed documents or derived documents) in distributed storage 104A, as described more fully in connection with the following Figures. While processors 104B and 104C both process documents, they may receive items at different times and thus must coordinate with index 106 in order to preserve the ordering of documents and derived documents extracted from the documents as described more fully in the following Figures. Importantly, the method utilizes an event index to ensure that events are processed in the correct order, thus ensuring that the correct "state" of a document (and any derived documents) is maintained regardless of the order in which events are received.

Processors 104B and 104C may comprise multiple processing devices. In one embodiment, processors 104B and 104C can comprise dedicated commodity hardware. In other embodiments, processors 104B and 104C comprise virtual machines that are spawned as needed. In some embodiments, batch processors 104B may execute in a MapReduce environment to process documents. In some embodiments, stream processors 104B may utilize a big data stream processing library to process incoming data (e.g., APACHE SPARK).

Content grid 104 further includes an administrative gateway 104D allowing the management of the content grid and the index 106. In one embodiment, administrative gateway 104D enables the creation of new derived document types. In one embodiment, derived document types may be designed by operators of the system 100 as new features are added to the system. For example, the system 100 may initially only include a derived document type corresponding to document attachments in email messages. At a later time, via administrative gateway 104D, a derived document type corresponding to photos included with email messages may be added. In this instance, the system would be required to re-index all content in order to support the new derived document type, as described herein.

Content grid 104 is communicatively coupled to index 106. In one embodiment, content grid 104 and index 106 communicate via processors 104B and 104C. Specifically, processors 104B and 104C query, insert, update, and remove items in index 106 based on processing incoming documents. Management of the index 106 is described more fully in connection with FIGS. 4 and 5.

Index 106 includes a content index 106A. In one embodiment, content index 106A is designed to store details regarding documents and derived documents extracted from documents. Content index 106A additionally serves all user queries for items. In the illustrated embodiment, queries are received over a network from consumers 108 via search middleware 106C. In one embodiment, middleware 106C performs various pre-processing and load-balancing operations on incoming queries. In one embodiment, search middleware may comprise one or more elasticsearch instances.

Index 106 additionally includes an event index 106B. In one embodiment, event index 106B stores data regarding events received via processors 104B and 104C. In one embodiment, event index 106B is used to synchronize changes to content that is indexed in content index 106A, as described in more detail herein.

Although illustrated as separate indexes, in some embodiments content index 106A and event index 106B may share the same physical index.

System 100 additionally includes one or more consumers 108 including applications 108A, third-party systems 108B, browsers 108C, and administrators 108D. In one embodiment, consumers 108A-108C may comprise various consumers that issue queries to search middleware 106C. For example, an application 108A may comprise a desktop application issuing API requests or a mobile device. A system 108B may comprise a third-party system that utilizes the processing of the system as an input into such systems (e.g., via OAuth authorization). A browser 108C may comprise a web-based application (described more fully in connection with FIG. 8). Finally, an administrator 108D may comprise a system 100 administrator managing the system via gateway 104D.

Figure 2:
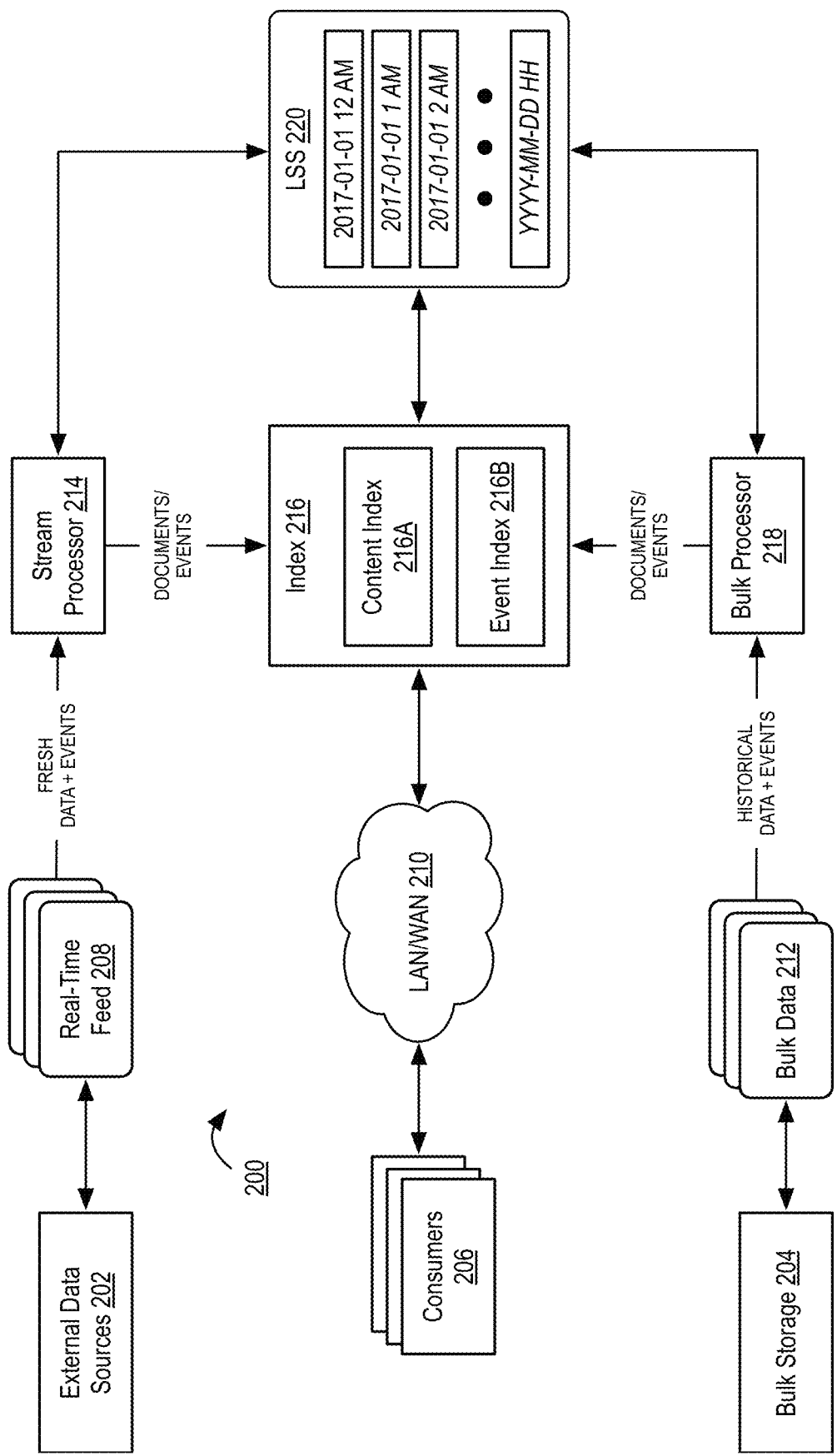
FIG. 2 is a functional diagram illustrating a personal search system according to some embodiments of the disclosure.

FIG. 2 is a functional diagram illustrating a personal search system according to some embodiments of the disclosure.

As illustrated in FIG. 2, index 216 receives documents and derived documents from stream processor 214 and bulk processor 218. Stream processors and bulk processors were described in connection with FIG. 1 (and are disclosed in more detail herein) and the details of these devices are not repeated herein. As described previously, fresh, real-time data and events are received by stream processor 214 via one or more real-time data feeds 208 provided by one or more external data sources 202. Similarly, historical data and events are received by bulk processor 218 via one or more bulk data streams 212 provided by one or more bulk storage devices or services 204. In one embodiment, data received by stream processor 214 and bulk processor 218 may be substantially unchanged from the form the data exists in external data sources 202 and bulk storage 204, respectively.

In one embodiment, a historical document is received by bulk processor 218. Bulk processor 218 processes the document to identify one or more derived documents within the document. In response, the bulk processor 218 stores the derived documents in log-structured storage (LSS) 220.

LSS 220 comprises a logical storage device that stores data in a series of time slices. In one embodiment, the time slices may be partitioned in hours, although other time periods may be used. In the illustrated embodiment, the LSS 220 begins creating time slices when the system is first started. Thus, in the illustrated embodiment, the system was started at midnight on Jan. 1, 2017.

In the illustrated embodiment, data stored in LSS 220 is stored at the time of its arrival to the system 200 (e.g., by processors 214 and 218). Thus, at every new period of time (e.g., every hour) a new folder or timeslice is created. Incoming data is thus placed in the most recent timeslice. Notably, the use of a log-structured storage reduces the complexity of organizing data that is received for multiple users and multiple times.

In addition to storing the documents or derived documents in LSS 220, bulk processor 218 indexes the documents/derived documents in index 216 via content index 216A. Additionally, bulk processor 218 receives events which may be indexed in event index 216B.

In a first embodiment, the data received by bulk processor 218 comprises a document that may include a derived document. In this embodiment, bulk processor 218 indexes the document in content index 216A. Next, the bulk processor 218 reconciles the indexed document based on previously indexed events in event index 216. The details of reconciling indexed documents with events is described more fully in connection with FIGS. 4 and 5, the details of which are incorporated herein by reference in their entirety.

While the foregoing description describes the indexing of documents or derived documents, both stream processor 214 and bulk processor 218 are additionally configured to receive events from external data sources 202 and bulk storage 204, respectively. Further, stream processor 214 and bulk processor 218 are configured to index these events in event index 216B (as described more fully in connection with FIG. 5). Additionally, stream processor 214 and bulk processor 218 may also update the attributes of documents and derived documents indexed in content index 216A.

While described in the context of bulk processor 218, the functions of stream processor 214 are substantially similar. Notably however, stream processor 214 and bulk processor 218 operate in parallel. The fact that these processors operate in parallel necessitates the use of event index in order to synchronize changes to the same document or derived document extracted by both processors. Specifically, the use of event markers stored in event index 216B enables both processors to logically arrange the sequence of events of documents and ensure that only the latest version of a given document is indexed. Thus, if a deletion event is received and indexed by stream processor 214, the event index 216B and content index 216A are both updated. If, at a later date, the original document associated with the deletion event is received, the bulk processor 218 utilizes the indexed event to ensure that a deleted document is not inadvertently indexed. Thus, by using event markers, the system allows for the out-of-order processing of events while ensuring that the state of the document remains consistent.

In addition to the indexing components, the system 200 includes consumer 206 which may correspond to the consumers described in connection with FIG. 1. Consumers 206 issue search queries to index 216 over a LAN or WAN 210 (e.g., the Internet). The process of processing search queries is described more fully herein.

In some embodiments, search queries are received at any moment, regardless of the state of index 216. Thus, after an activation event, the index 216 may not be complete before queries are received. Clearly, it is undesirable to return an incomplete result set in response to a query. Additionally, it is undesirable to return a result set that includes "gaps" in historical content due to the time delay in processing an extensive historical data backlog. Further, it is equally undesirable to return, for example, documents that were deleted or update where the events have not yet been indexed.

Thus, the system 200 utilizes a search middleware component to manage the data returned in response to a search query. In general, the system 200 manages the current state of the index to determine the time periods in which to perform queries. Descriptions of these techniques are described more fully in connection with FIGS. 7A-7C.

Figure 3:
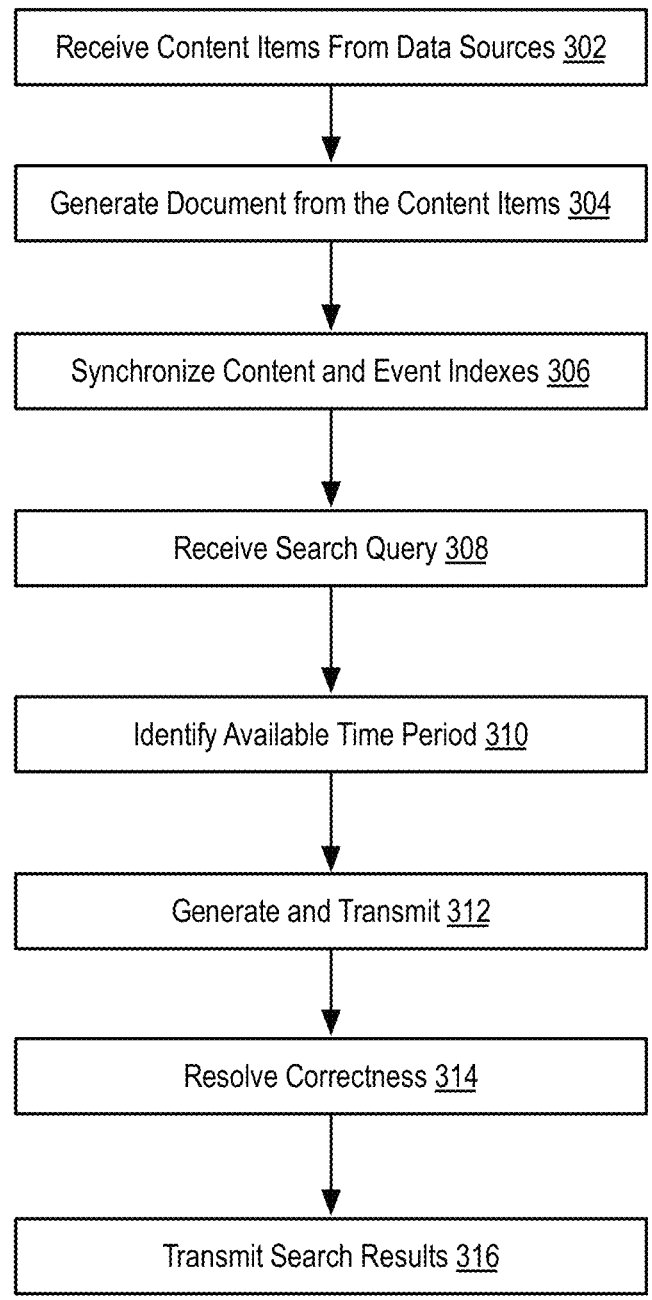
FIG. 3 is a flow diagram illustrating a method for providing high-throughput search functionality in a personal search system according to some embodiments of the disclosure.

FIG. 3 is a flow diagram illustrating a method for providing high-throughput search functionality in a personal search system according to some embodiments of the disclosure.

In step 302, the method receives content items from one or more data sources.

In one embodiment, the content items comprise both historical content feeds and real-time or fresh content feeds. As used herein historical content items refer to a stream of historical content received from an external or internal data source. In one embodiment, a historical content items are defined as of the time the method operates. That is, if the method is executed at time to, all data stored in an external (or internal) data source at that time comprises historical content items. Conversely, in one embodiment, a real-time content items refer to content items representing data after time to. In some embodiments, a single content provider may provide both real-time and historical content items. Although primarily discussed in terms of a single historical and single real-time feed, there is no limitation on the number of feeds of each type that may be used.

As an example, email messages associated with a user may be stored by a content provider (e.g., YAHOO MAIL). When the method activates, all content stored by the content provider (e.g., email messages) as of to may be referred to as historical content items. That is, the content provider may provide an API for access content items that were previously stored. Conversely, the content provider may also provide content items corresponding to new, incoming email messages. As another example, a user's photo sharing "stream" may comprise a real-time content feed. Both historical and real-time content feeds may be received in parallel. Examples of this parallel nature are discussed more fully in connection with FIG. 7A.

In step 304, the method generates a document from a content item.

Figure 8:
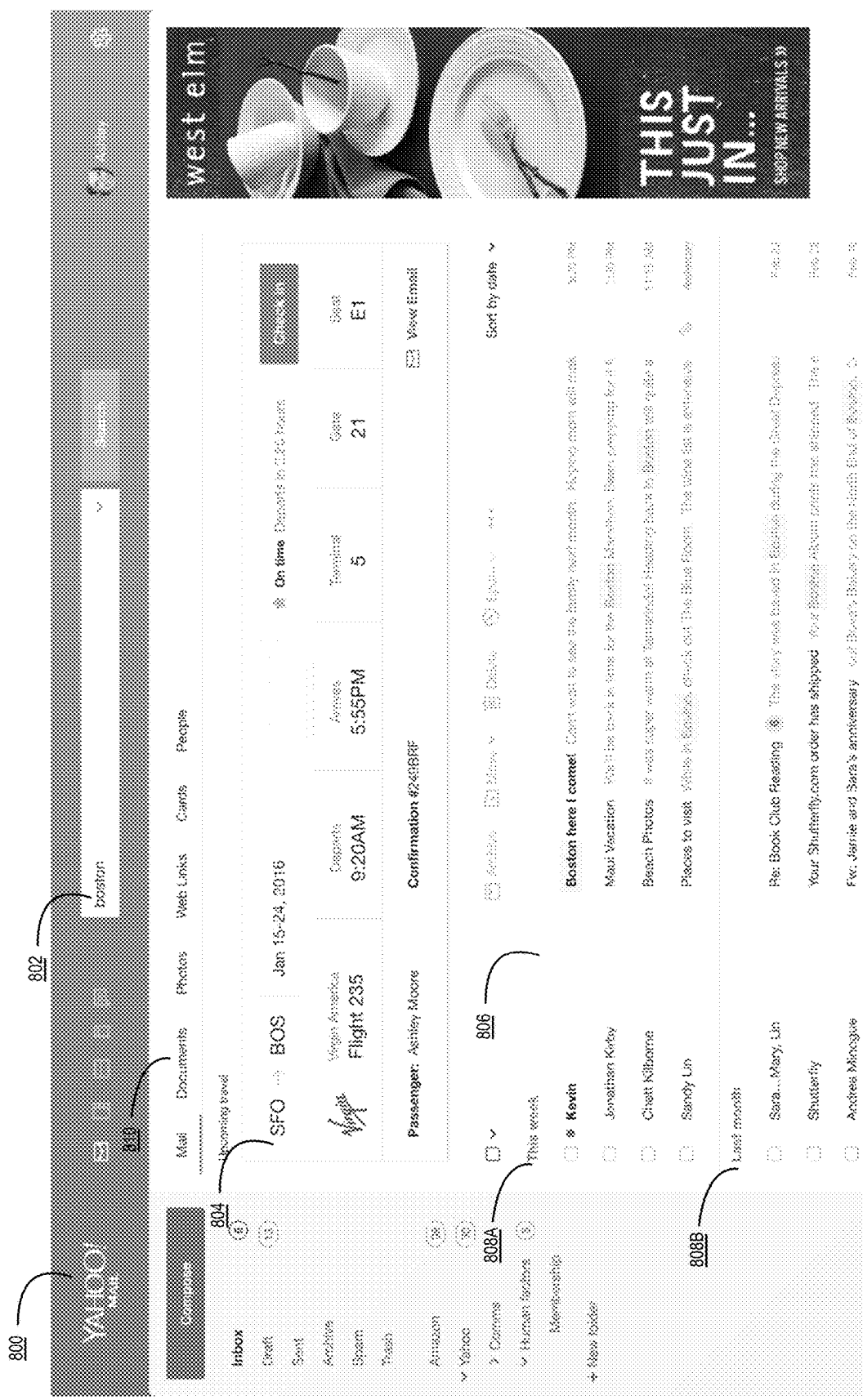
FIG. 8 is a screen diagram illustrating a user interface for accessing a personal search system according to some embodiments of the disclosure.

As used herein a document refers to a translation of the individual content items in a content feed. In some embodiments, a document can refer to the content item itself (e.g., an email received as part of an email feed). Alternatively, or in conjunction with the foregoing, a document can refer to an "derived document" included within the content item. For example, an email message (i.e., an item in a content feed) can include a receipt or an itinerary (e.g., a flight reservation). In this instance, the method generates a document corresponding to the derived document in the content item (e.g., creating an itinerary derived document, a receipt derived document, etc.). Importantly, a derived document may be stored as a document in the same manner as an original document, thus enabling the interleaving of derived documents (e.g., itineraries) with original documents (e.g., email messages) for further processing or for generating search results (as depicted in FIG. 8). Thus, in some embodiments, the method may create multiple derived documents for a single document. That is, in the previous example, a document for the email message itself as well as derived documents for the content within the email message.

In one embodiment, each document processed in step 304 is assigned a unique identifier (e.g., an incremental ID, a GUID, a UUID, or similar unique identifiers). Since identifiers are assigned to documents an email message may be assigned a first unique identifier while a derived document may be assigned a second unique identifier. In one embodiment, if a document has derived documents, each of the derived documents may further be assigned a parent identifier that identifies the document that was responsible for the generation of the derived documents. For example, a document corresponding to the email message is assigned an identifier of 12345 while a derived document in the email is assigned an identifier of 67890 and a parent identifier of 12345. In this manner, relationships between derived documents and documents is preserved.

In some embodiments, the document may also be assigned various other parameters. In one embodiment, the document may be assigned a timestamp corresponding to the date and/or time associated with the document. For example, an email message may include a date and time the email was received. Additionally, the content of the document may be stored with the document (e.g., the contents of the email). In one embodiment, content of a document may comprise the raw content of the document. Alternatively, or in conjunction with the foregoing, the content of the document may comprise content extracted from the document, in the case of derived documents. For example, an itinerary may be extracted using document parsing techniques and converted to a structured data format (e.g., JSON, XML, etc.). This structured content may be stored along with the document as the content. In another embodiment, the method may store various other attributes associated with the document (e.g., source identifier, URL of item, permissions, etc.). In some embodiments, derived documents may include additional detail not included within the document associated with the derived document. For example, an airline reservation derived document may include gate information, flight delays, or other information that is not originally present in the document (e.g., email) that is the parent of the derived document.

In step 306, the method synchronizes content and event indexes.

As described above, the method utilizes both a content index and an event index. When new documents (including derived documents) are identified, an attempt is first made to insert the document into a content index. Details of indexing a document is described more fully in connection with FIG. 4, the disclosure of which is incorporated herein by reference in its entirety.

In addition to indexing the document, the method may index an event associated with a document. In one embodiment, events may be associated with documents themselves. Alternatively, or in conjunction with the foregoing, events may be received as independent documents. In this embodiment, an independent event may comprise an event object identifying a document and including an event type (e.g., update, delete, move, etc.). Details of indexing a document are described more fully in connection with FIG. 5, the disclosure of which is incorporated herein by reference in its entirety. In some embodiments, other events may be processed such as new message events, metadata changes, etc.

Figure 4:
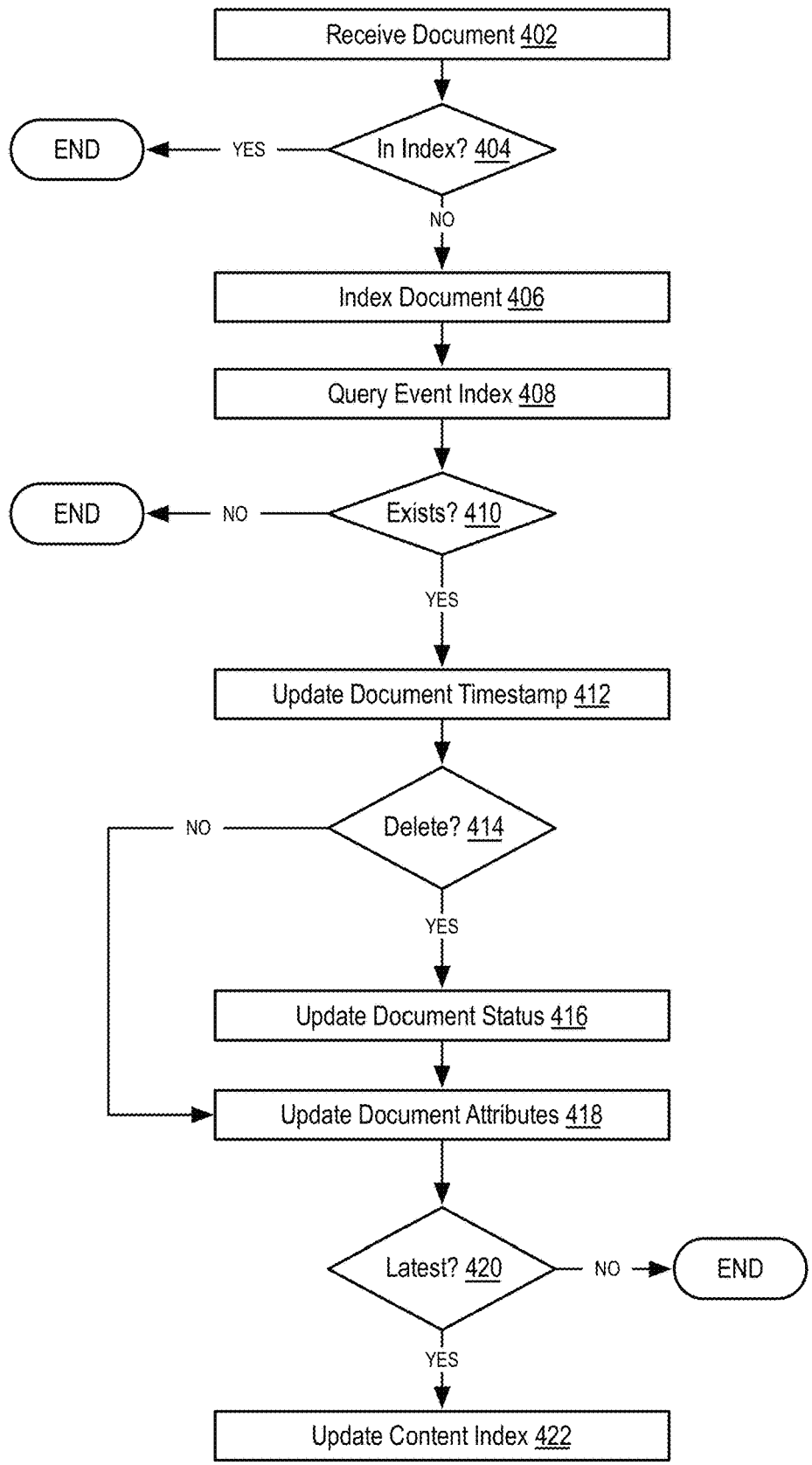
FIG. 4 is a flow diagram illustrating a method for processing documents in a personal search system according to some embodiments of the disclosure.

FIG. 4 is a flow diagram illustrating a method for processing documents in a personal search system according to some embodiments of the disclosure.

In step 402, the method receives a document.

As described above, a document refers to either a document or a derived document extracted from a document. In one embodiment, a document received in step 402 includes a user identifier associated with the document, a unique document identifier, a parent identifier (if applicable, for example, for derived documents), a timestamp, the content of the document, and various attributes as discussed previously.

In step 404, the method checks to determine if the document is already indexed.

In some embodiments, the method may perform step 404 to ensure that duplicates of documents are not present within the indexes. For example, in a parallel processing environment, step 404 acts as an initial gating function to ensure that documents are only indexed once in a given indexing process. In some embodiments, the method may bypass step 404 in the event that the method is processing a historical backlog again in response to the creation of a new derived document type (as described herein).

In step 406, the method indexes the document.

In one embodiment, indexing a document comprises inserting the received document properties into a content index. In one embodiment, the content index utilizes a schema including a tuple representing the user identifier and document identifier, parent identifier (if applicable), timestamp, and attributes of the content. In one embodiment, the content index does not store the actual content of the document or derived document. As described previously, the content index responds to user queries and allow for retrieval of document and derived documents via indexed attributes, identifiers, and timestamps of the underlying document.

In step 408, the method queries an event index.

Figure 5:
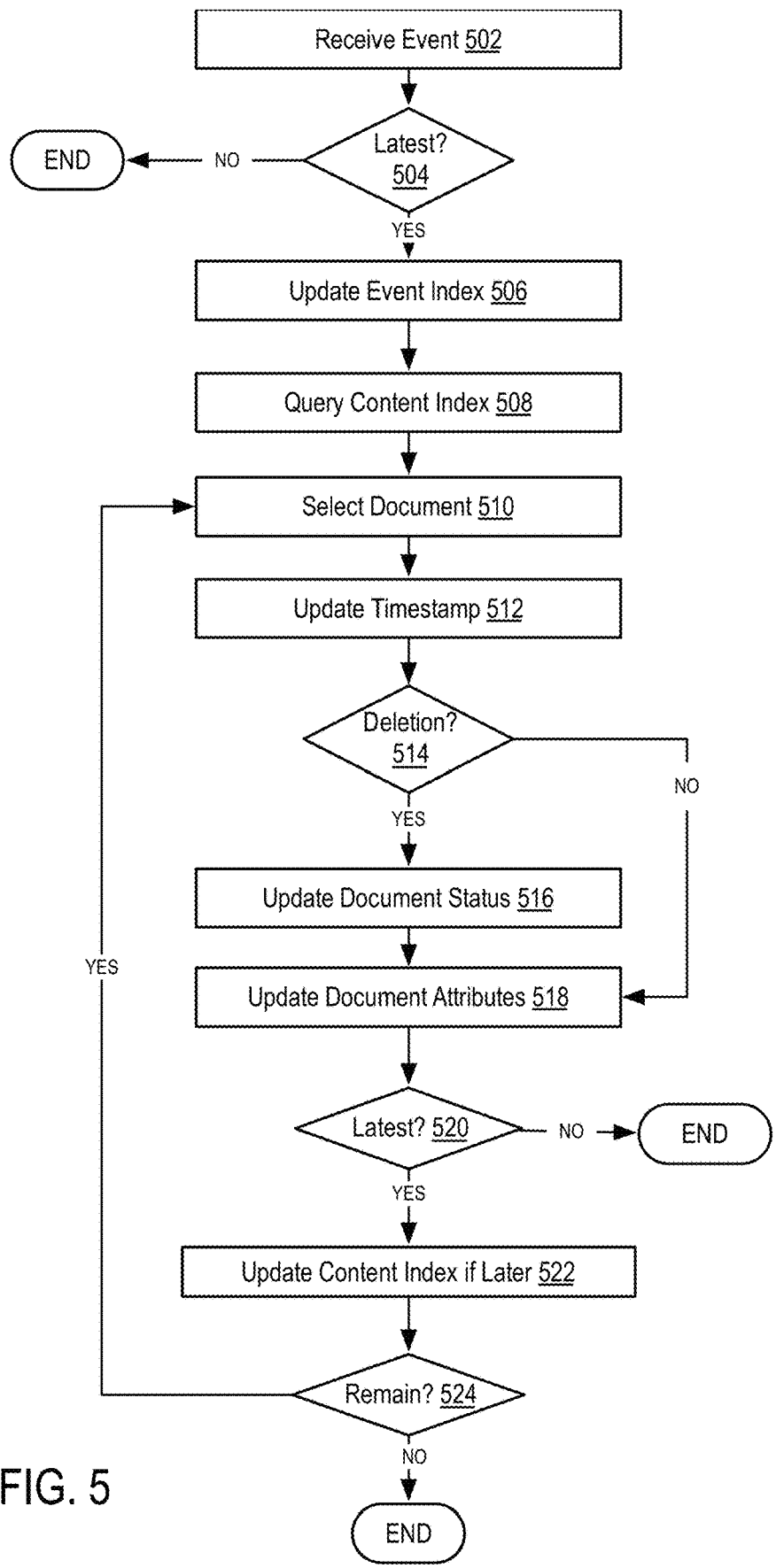
FIG. 5 is a flow diagram illustrating a method for processing events in a personal search system according to some embodiments of the disclosure.

The process of creating and updating an event index is described more fully in connection with FIG. 5, the disclosure of which is incorporated herein by reference. The following description assumes that at least a partial event index has been created.

In one embodiment, the event index utilizes a schema that includes a tuple including the user identifier and parent identifier, a timestamp of the event, an event type (e.g., update, delete, etc.), and attributes associated with the document associated with the event. In this manner, the method queries the event index by determining if an object exists that includes the user identifier and parent identifier of the document indexed in step 406.

In some embodiments, the method may receive multiple events for a given user identifier and parent identifier tuple. In this case, the method may repeat steps 412, 414, 416, 418, 420, and 422 for each event. In one embodiment, the method may first sort the events by the timestamp associated with the events prior to processing (i.e., to preserve the order of operations performed on the item).

In step 410, the method determines if an event exists. If no event matches the user identifier and parent identifier of the document, the method ends. In this scenario, no events have been processed relating to the document and the document was properly indexed in step 406.

In step 412, the method updates a document timestamp associated with the document received in step 402 and indexed in step 406.

As described above, the document received in step 402 includes a timestamp associated with the document. For example, a historical email message may be associated with a timestamp corresponding to an arrival time. However, as discussed above, the method may index real-time events concerning the email prior to reaching the email in the historical backlog. Thus, at step 408, the method may have indexed an event relating to the email but not the email itself, the event occurring in real-time after activation of the method.

In this instance, the method must reconcile the indexed event with the newly received document as described in steps 412, 414, 416, 418, 420, and 422.

Returning to step 412, the method first de-normalizes the event by updating the timestamp of the document. In one embodiment, the method replaces the timestamp received in step 402 with the timestamp associated with the event.

In step 414, the method determines if the event is a deletion event. As described above, a deletion event corresponds to an event received that indicates that the underlying document was deleted (e.g., by a user). Alternatively, or in conjunction with the foregoing, the deletion event may comprise an archive event or similar event.

In step 416, the method updates the document status if the event is a deletion event. In one embodiment, updating the status of a document comprises setting a status attribute of the document to be indexed as deleted (or archived, etc.). In some embodiments, deleted content is still maintained in the index while in other embodiments the method may remove the document from the index upon detecting a deletion event.

In step 418, the method updates attributes of the document based on the attributes associated with the event.

As described above, an event may be associated with a plurality of attributes such as file sizes, locations, URLs, etc. The disclosure does not place any limit on the type of attributes associated with events or documents and indeed, the number and type of attributes may be expanded or reduced based on the underlying data source. For example, a photo sharing site may include photo-specific metadata (e.g., EXIF data, comments, etc.).

In one embodiment, the method may replace the attributes of the document received in step 402 and indexed in step 406 with the attributes received as part of the event object. In an alternative embodiment, the method may merge the event attributes with the document attributes. In some embodiments, the attributes may be associated with metadata indicating a timestamp the attribute was added. In this case, the method may select newer attributes and only update those attributes newer than the existing document attributes.

At the end of step 418, the method has first indexed the received document (step 406) and has retained the underlying document object and updated the properties of the object according to the event attributes (steps 412, 416, 418).

In step 420, the method determines if the updated document (created in steps 412, 416, and 418) is the latest version of the document. Steps 412-420 ensure that the content index is updated with the latest version of a document (or derived document) and ensures that "stale" events are not propagated through the system for a given document or event.

In one embodiment, the method compares the timestamp of the object generated in step 412 to the original timestamp of the document indexed in step 406 to make this determination. If the updated document timestamp is earlier than the timestamp in received document, the method ends and retains the original indexing of the document performed in step 406. Specifically, the method ends as the document indexed in step 406 is the latest version and the events in the index may be ignored. In the illustrated embodiment, the method maintains the event indexing in order to preserve a history or log of changes to the document.

In step 422, the method updates the content index.

In the illustrated embodiment, updating a content index may be performed in the same manner as described in connection with step 406. However, in step 422, the method does not create a new index entry but rather updates the existing index entry with the attributes extracted from the event index in steps 412, 416, 418.

As illustrated in FIG. 4, the method provides a technique for handling out-of-order indexing of both historical and real-time data feeds. Importantly, the method utilizes two separate indexes, one for content and one for events. The use of the event index allows for synchronization of documents and their changes and prevents errant items from being indexed.

FIG. 5 is a flow diagram illustrating a method for processing events in a personal search system according to some embodiments of the disclosure.

In step 502, the method receives an event.

Descriptions of events have been described previously, the disclosure of which is incorporated by reference in their entirety. As an example, an event may comprise an update, delete, metadata change, or other non-content action performed on a document.

In one embodiment, an event refers to an event (or action) performed on a document (e.g., an email message) received as part of a content feed. Examples of events include the deletion of documents, moving of documents (e.g., to different folders), and other operations that affect the status of a document. In one embodiment, events are received via an API of a document provider (e.g., an email service). In this embodiment, the document provider provides an API that allows access to events for the underlying documents stored by the provider. The document provider does not provide events relating to derived documents as these are extracted by the method itself and not by the document provider. Thus, as described herein, the method must identify derived documents associated with documents corresponding to an event.

In step 504, the method determines if the event is the latest event with respect to the document associated with the event.

As described above, events are associated with timestamps. In some embodiments, these timestamps may be included in the data feed that transmits events to the system. In other embodiments, the arrival time of the event at the system may be used as the timestamp. As will be described herein, timestamps of the events are included in the event index for later retrieval and thus, the method in step 504 compares the received event timestamp to the indexed timestamps.

In one embodiment, events may be received out of order, thus the method must determine whether the current, received event is the most recent event. For example, a photo may be updated multiple times. In this example, the method may only index the most recent event known to the method at the time.

If the method determines that the received event is not the latest event, the method ends. In some embodiments however, the method may continue to process the event in order to maintain a historical log of all events.

In step 506, the method updates the event index.

As described above, the event index utilizes a schema that includes a tuple including the user identifier and parent identifier, a timestamp of the event, an event type (e.g., update, delete, etc.), and attributes associated with the document associated with the event. Thus, in step 506, the method may insert these data points associated with the event into the event index.

In step 508, the method queries the content index.

In one embodiment, the method queries the content index by using the user identifier and the parent identifier included within the event. In one embodiment, the query identifies any documents that match both the user identifier as well as the parent identifier. In one embodiment, the method may return a single document or multiple documents matching the parent identifier. For example, in one embodiment, the parent identifier may identify an email with no derived documents included. However, in some embodiments, the parent identifier may identify an email with multiple derived documents, thus the method would return the email and all derived documents.

In one embodiment, a parent identifier refers to an identifier associated with a document (e.g., an email message). In this embodiment, the method queries the content index for both the document (using the identifier of the stored document) as well as any derived documents associated with the document (using the parent identifier of the stored document). For example, a content index may store an email message with an identifier of "1" and multiple derived documents each having a parent identifier of "1". In this example, in step 508, the method queries the content index to identify all records having an identifier of "1" and all records having a parent identifier of "1", thus obtaining the document and all derived documents.

In step 510, the method selects a document from the documents returned from the content index.

As described above, in some embodiments multiple documents may be associated with a parent identifier used to query the content index. As one example, multiple derived documents may be included in a single email, thus the event (e.g., a deletion of the email) must be applied to both the parent item (the email) and the derived documents.

In step 512, the method updates the timestamp of the selected document with the event timestamp.

In step 514, the method determines if the event type is a deletion event.

In step 516, if the event is a deletion event, the method updates the selected document status.

In step 518, the method updates attributes of the selected document based on the attributes associated with the event.

In step 520, the method determines if the updated, selected document (created in steps 512, 516, and 518) is the latest version of the document.

In step 522, the method updates the content index if the document timestamp is later than the event timestamp. Steps 512-520 ensure that the content index is updated with the latest version of a document (or derived document) and ensures that "stale" events are not propagated through the system for a given document or event.

Notably, the aforementioned steps 512, 514, 516, 518, 520, and 522 may be performed in the same manner as described in connection with steps 412, 414, 416, 418, 420, and 422, the disclosure of which is incorporated herein by reference. In general, steps 512, 514, 516, 518, 520, and 522 result in the creation of an updated document object that is updated based on the properties of the received event (versus indexed events in steps 412, 414, 416, 418, 420, and 422).

In step 524, the method determines if any documents remain in the set returned from the query in step 508 and if so, performs steps 512, 514, 516, 518, 520, and 522 for each document. If no documents remain, the method ends.

In some embodiments, the method described in FIGS. 4 and 5 may be batched. In this embodiment, access to the content indexes and event indexes (e.g., queries, updates, etc.) may be combined into single batched requests. In some embodiments, the method may batch the access based on attributes of the events or documents. For example, the method may batch access to the indexes based on the user identifiers associated with the documents/events.

As described, steps 510 through 524 may be performed both for documents and derived documents. Thus, continuing the example described in connection with step 508, the method may receive a deletion event for an email message. In this example, the method performs steps 510 through 524 for both the document and any derived documents. By performing steps 510 through 524, the method ensures that all events corresponding to a document are propagated to the derived documents.

Returning to FIG. 3, the method may access the indexes to respond to search queries.

In step 308, the method receives a search query.

In some embodiments, a search query comprises a keyword or text-based search string received via a user interface. In other embodiments, the query may be received programmatically via an API.

In step 310, the method determines an available time period.

As described above (and also herein), when the method is activated a query may be received prior to the method fully indexing historical data. For example, if a user's data comprises 12 months of data and one month of day is capable of being processed a day, any query issued in the first 12 months would not have access to all historical data. Conversely, all queries would have access to real-time data as this data is processed immediately. Thus, in step 310 an appropriate limit must be determined to ensure that search results do not include temporal "gaps."

In this scenario, the method must determine an appropriate time period in which to execute searches. In one embodiment, the method may begin indexing historical content from the "beginning of time" (i.e., from the earliest point in which data exists) and thus the method may limit searches to only indexed, real-time content until the method has fully indexed the historical backlog. Alternatively, the method may index historical content starting at the time the method begins and work "backward" to the "beginning of time." In this case, the method may provide search access to both real-time data and a certain amount of time in the past (e.g., three recent months if the query was issued on day three). Both scenarios are described more fully in connection with FIG. 7A-7C.

Additionally, the method may be re-executed as new derived document types are added to the system. In this scenario, the method provides full search capability for existing derived documents but limits searches to the newly added derived documents in a similar manner as described above.

In step 312, the method generates and transmits a query to the content index. In one embodiment, the query comprises a query to a content index generated as discussed above. A detailed description of the query generation process is described more fully in connection with FIG. 6.

Figure 6:
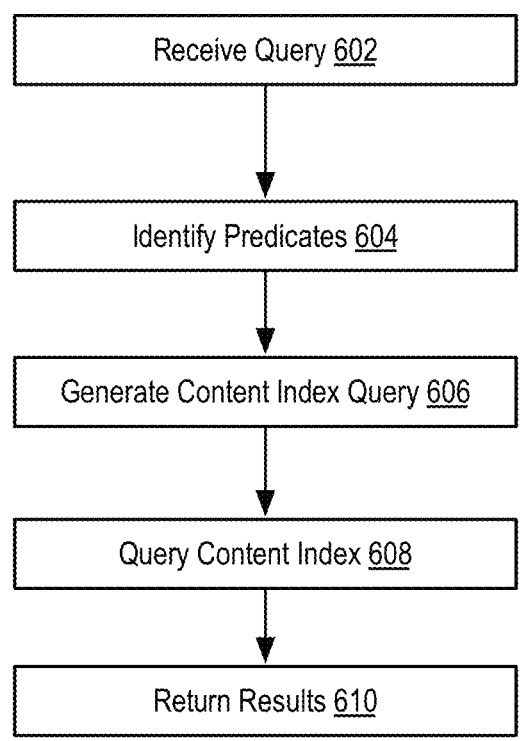
FIG. 6 is a flow diagram illustrating a method for evaluating queries in a personal search system according to some embodiments of the disclosure.

FIG. 6 is a flow diagram illustrating a method for evaluating queries in a personal search system according to some embodiments of the disclosure.

In step 602, the method receives a search query.

In one embodiment, a query includes one or more keywords. For example, keywords may be entered via a web-based user interface as illustrated in FIG. 8. Alternatively, keywords may be submitted programmatically via an API.

In one embodiment, the search query additionally includes a user identifier. In this embodiment, the user identifier may be extracted from a session identifier associated with the user (or program) issuing the search query (e.g., via a cookie).

In step 604, the method identifies one or more predicates.

As used herein a predicate refers to a conditional statement returning a Boolean value. In one embodiment, the predicates include statements defining an index query that return documents having a user identifier equaling the user identifier in the query and a content value matching the keywords (e.g., content including the keywords).

In one embodiment, the predicates may include matching the timestamp to a given timestamp or range of timestamps. In one embodiment, the predicates may include ensuring that the timestamps are within a range of timestamps that have been indexed with no gaps. In one embodiment, the predicates may include ensuring that the status of the return documents is not a deleted status. In one embodiment, the predicates may include any other conditional statements related to the attributes of the documents.

Notably, the number of predicates may be determined programmatically. For example, as derived document types are added to the system, the method may identify new predicates to be used in query generation.

In step 606, the method generates a content index query and, in step 608, issues the query to the content index.

In one embodiment, the method generates the predicates using the query (or other data) and generates an access request to a content index. For example, in one embodiment, the method may chain predicates using a Boolean and operator.

In step 610, the method returns the results to the issuing user, as described in more detail below.

Returning to FIG. 3, the method post-processes returned documents (including derived documents) and transmits the results to the requesting user.

In step 314, the method resolves correctness of the return results.

In an ideal scenario, all historical and real-time data has been indexed and if so, the method may bypass step 312 as there may be no conflicts in the correct ordering of documents. However, in many instances (including scenarios where the historical backlog has not fully been indexed), the method must analyze the search results to ensure that inconsistencies are not returned.

In instances where there may be "gaps" in the search results, the method processes the results to remove such gaps. For instance, each returned result may be associated with a timestamp. In this case, the method compares the timestamps to identify if any results are separated by a predetermined gap. For example, the method may ensure that results are only separated by, at most, one month.

Further, the method may analyze the event index to determine that the documents returned from the search represent the latest version. For example, in one embodiment, an event may be processed prior to the search while the document return is not processed until after the search. In this embodiment, the method may exclude the document from the search results as the content index has not yet been updated based on the event processing.

In step 316, the method transmits the resolved search results.

In one embodiment, the method may transmit the search results as part of a search results interface such as the one illustrated in FIG. 8, the disclosure of which is incorporated herein by reference in its entirety.

Figure 7A:
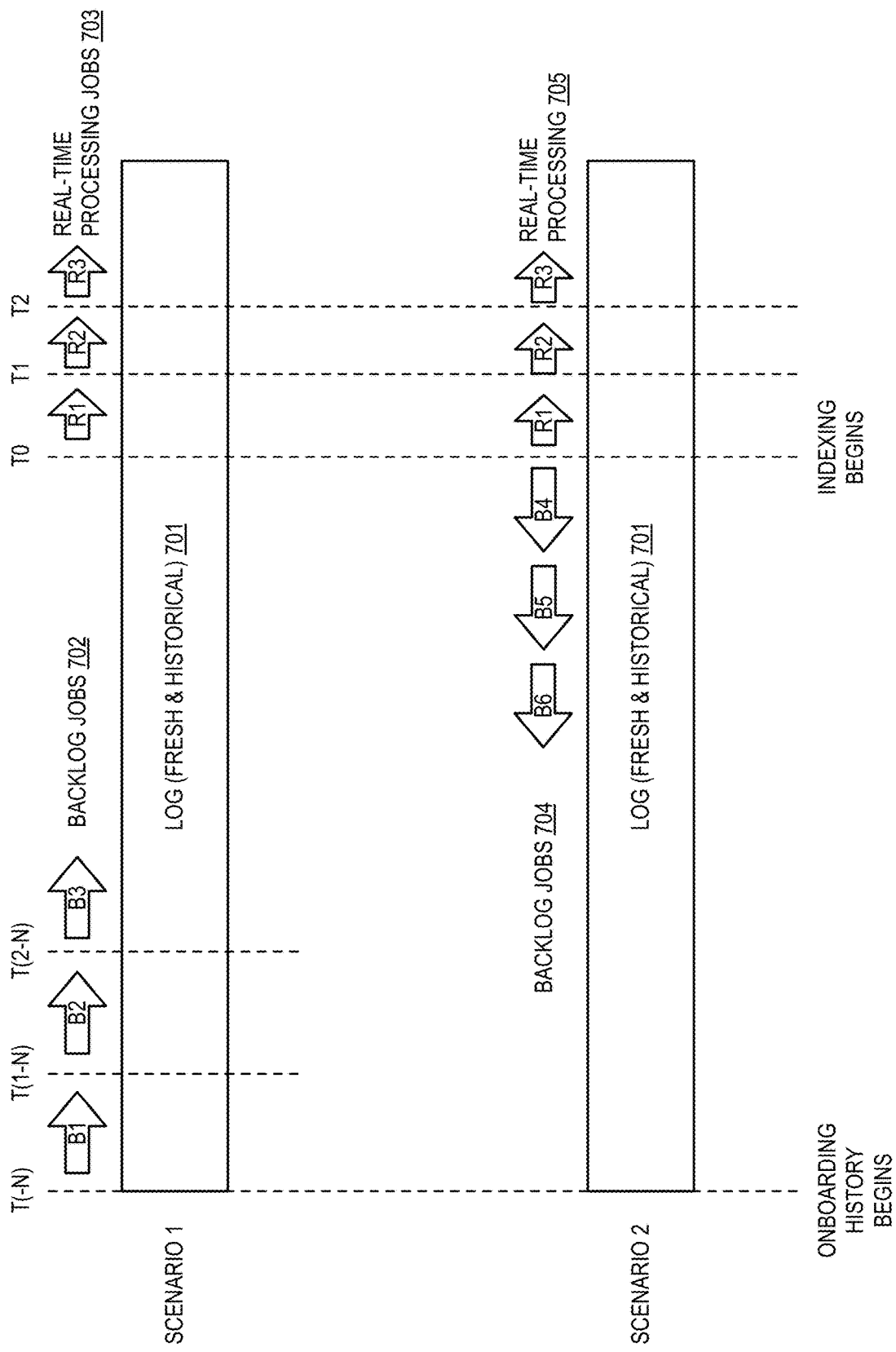
FIG. 7A is a diagram illustrating alternative embodiments for indexing historical and real-time content according to some embodiments of the disclosure.

FIG. 7A is a diagram illustrating alternative embodiments for indexing historical and real-time content according to some embodiments of the disclosure.

In both the illustrated scenarios, a user has a set of historical documents beginning at T(−N), when the onboarding history begins. For example, in a simple example, T(−N) may correspond to the date a user registered with a photo sharing website or email service provider. Between T(−N) and T0, the user amasses content as part of the regular usage of these services. At T0, indexing of the historical content and real-time content begins. In one embodiment, T0 corresponds to the time the personal search system begins operations. However, T0 may also correspond to the time when new derived documents (i.e., new content types to index) are added to the personal search system.

In Scenario 1, jobs are processed starting at the earliest time possible, TN. In this scenario, after the indexing begins at T0, real-time processing jobs 703 are executed periodically moving forward in time from T0. Conversely, backlog jobs 702 are executed sequentially beginning at T(−N) and continuing up to T0. While described as executing sequentially, backlog jobs 702 may additionally be executed in parallel, but logically may be considered as executing in sequence.

Thus, in Scenario 1, at T0, jobs R1 and B1 are executed, filling the log 701. At T2, R2 and B2 are executed, further filling the log 701. At T3, R3 and B3 are executed, further filling the log 701. Thus, the entire log is not filled until time TN, wherein all backlog jobs have processed. In this scenario, queries arriving before TN may only be issued for content indexed in the fresh log to avoid "gaps" in coverage due to unindexed portions of the historical data. Thus, Scenario 1 allows for more simplistic processing of queries (i.e., no correctness must be determined), it results in a longer amount of time until the system is fully operational.

Figure 7B:
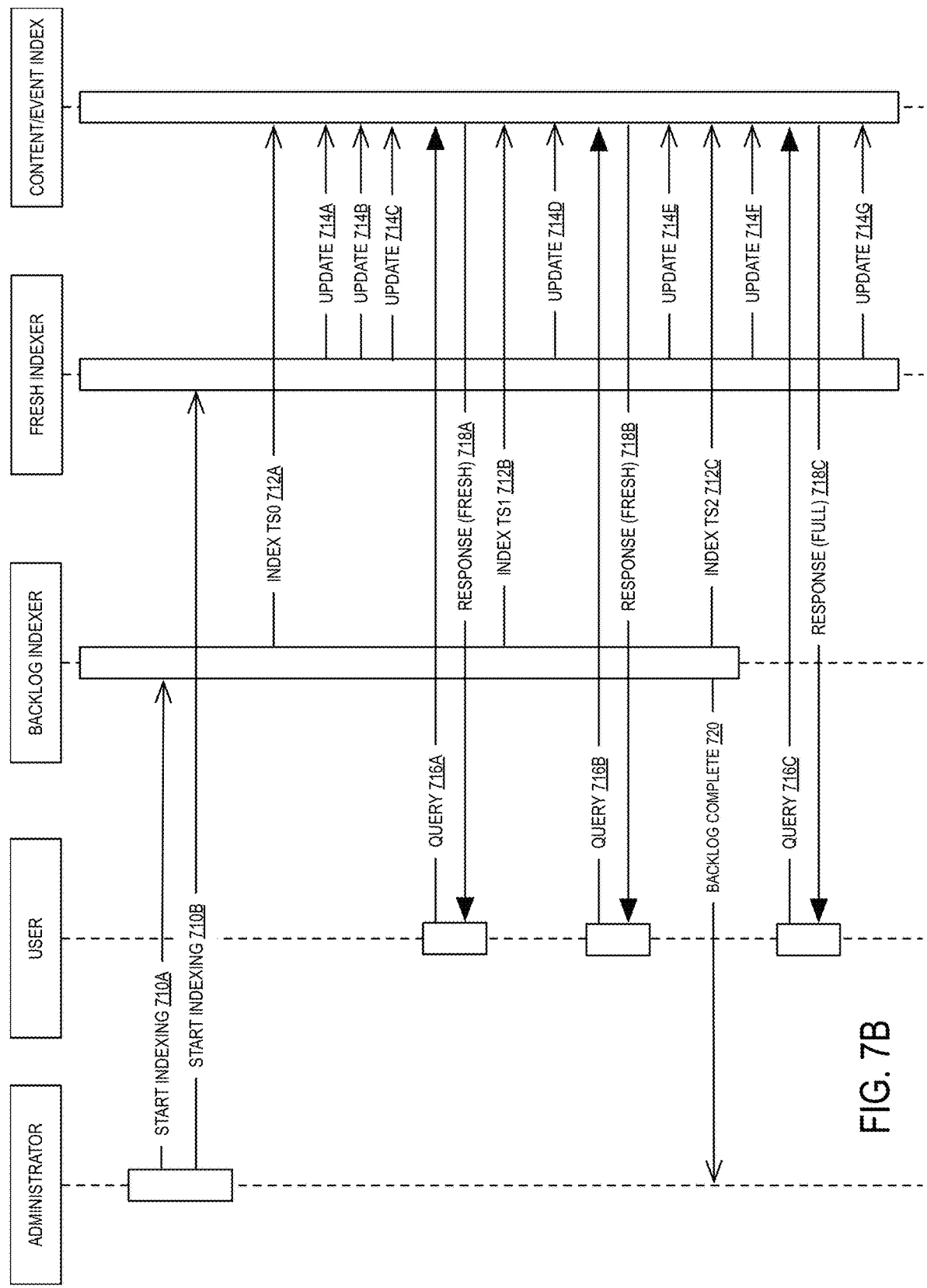
FIG. 7B is an activity diagram of a content indexing and querying process according to some embodiments of the disclosure.
Figure 7C:
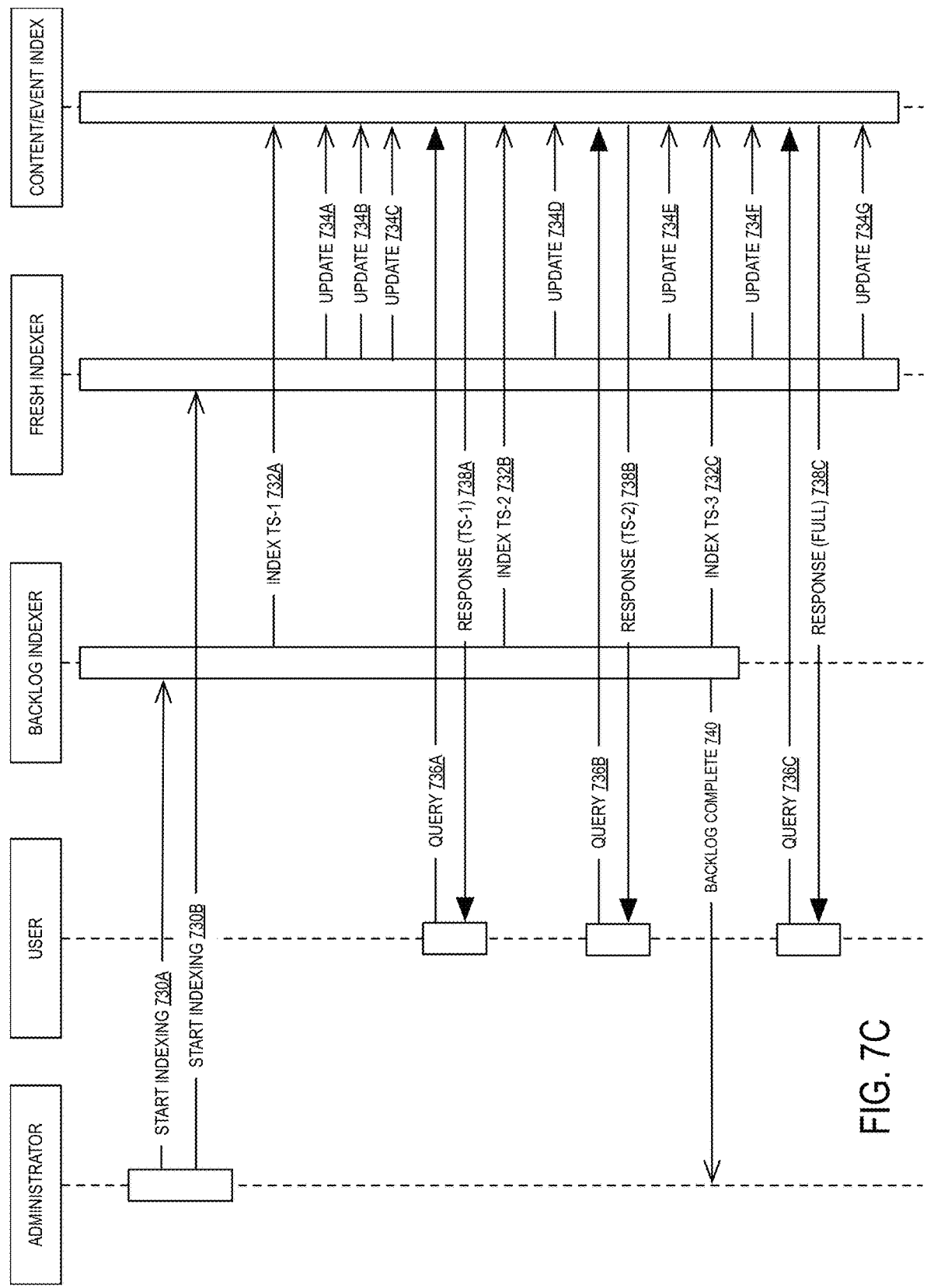
FIG. 7C is an activity diagram of a content indexing and querying process according to some embodiments of the disclosure.

Scenario 2 addresses the problems of Scenario 1 by reversing the ordering of backlog processing jobs. Specifically, at T0, jobs B4 and R1 are executed, filling the log 701 with the most recent unit of data and the latest historical unit of data. As an example, a unit of data may be considered as a month of data. At T1, jobs B5 and R2 are executed, expanding the range of indexed content one unit in each direction in time. Backlog jobs may continue to be run, again, until TN when all backlog data has been indexed. In Scenario 2, issued queries have immediate access to a larger amount of data as content is indexed cohesively. FIGS. 7B and 7C describe examples of the relationship between queries and indexing jobs discussed above.

FIG. 7B is an activity diagram of a content indexing and querying process according to some embodiments of the disclosure.

In the embodiment illustrated in FIG. 7B, indexing may be performed by Scenario 1 discussed in connection with FIG. 7A.

In step 710A, a start indexing command is received by the backlog indexer. In step 710B, a start indexing command is received by the fresh indexer. In some embodiments, these requests are issued simultaneously. Although illustrated as being issued by an administrator, there is no limitation on to when the indexing commands may be issued. As described above, they may be issued as part of the initialization of the system. Alternatively, or in conjunction with the preceding, the commands may be issued in response to the creation of a new derived document to be extracted from data feeds.

After an initialization, backlog index indexed a set of items corresponding to an initial time period is transmitted in step 712A. As described previously, the index update in step 712A corresponds to the first backlog job beginning at the beginning of a user's historical data feed (e.g., T(−N) in FIG. 7A). The illustrated embodiment provides an example where three backlog processing jobs must be completed before all historical data is indexed, although the number of processing jobs is exemplary only.

After the historical items are indexed in step 712A (or simultaneously), fresh data may be indexed in steps 714A-714C. As described above, fresh data may be indexed as it is received. Thus there may be some fresh documents indexed while the backlog processing jobs indexes historical data. In some embodiments, updates 714A-714G may be performed atomically (e.g., as a read-modify-write operation) to ensure correctness in the event of out-of-order updates. For example, each update may be performed using a CompareAndSet operation or a ConditionalUpdate operation. While described in the context of specific API calls (e.g., CompareAndSet), other atomic methods may be used independent of the underlying technology and the invention is not intended to be limited to a specific API.

While indexing is occurring, a user may issue a query in step 716A. As described above, queries may be issued by users via a web page or via an API and are transmitted to the content index for processing. For query 716A, the content index returns a response 718A. In this response (718A), the content index only returns fresh data that has been indexed (e.g., via updates 714A-C) as the backlog indexer has not yet indexed all historical content and thus a gap exists between the latest, indexed historical content and the earliest fresh, indexed content.

The backlog indexer continues to index data, indexing the second backlog job in step 712B. Additionally, another set of fresh, real-time data may be indexed as well in step 714D.

At a later point, a user issues a second query 716B. As with the previous query, the backlog indexer has not yet completed the historical indexing. Thus, the response 718B may again only return fresh data that has been indexed (e.g., via updates 714A-D). Additionally, another set of fresh, real-time data may be indexed as well in step 714E.

Ultimately, backlog indexer indexes the third, and final in this example, backlog job in step 712C. At this point, all historical content has been indexed, and the backlog indexer indicates to the administrator that the backlog processing jobs are complete in step 720. Additionally, another set of fresh, real-time data may be indexed as well in step 714F.

At this point, a third query 716C is issued to the content index. At this point, the content index has fully indexed all historical content and fresh content as well. Thus, response 718C comprises a full set of indexed items responsive to the query 716C.

As a final note, the fresh indexer may continue to index incoming fresh content as indicated by update 714G. At this point, all queries and responses after the backlog has been fully processed may return the full set of documents.

FIG. 7C is an activity diagram of a content indexing and querying process according to some embodiments of the disclosure.

In the embodiment illustrated in FIG. 7B, indexing may be performed by Scenario 1 discussed in connection with FIG. 7A.

In step 730A, a start indexing command is received by the backlog indexer. In step 730B, a start indexing command is received by the fresh indexer. In some embodiments, these requests are issued simultaneously. Although illustrated as being issued by an administrator, there is no limitation on to when the indexing commands may be issued. As described above, they may be issued as part of the initialization of the system. Alternatively, or in conjunction with the foregoing, the commands may be issued in response to the creation of a new derived document to be extracted from data feeds.

After an initialization, backlog index indexed a set of items corresponding to an initial time period is transmitted in step 732A. As described previously, the index update in step 732A corresponds to the most recent backlog job beginning at the time period immediately preceding the command to start indexing (e.g., T0 in FIG. 7A). The illustrated embodiment provides an example where queries may be handled with an ever expanding, contiguous index.

After the historical items are indexed in step 732A (or simultaneously), fresh data may be indexed in steps 734A-734C. As described above, fresh data may be indexed as it is received, thus there may be a number of fresh documents indexed file the backlog processing jobs indexes historical data. In some embodiments, updates 734A-734G may be performed atomically (e.g., as a read-modify-write operation) to ensure correctness in the event of out-of-order updates. For example, each update may be performed using a CompareAndSet operation or a ConditionalUpdate operation. While described in the context of specific API calls (e.g., CompareAndSet), other atomic methods may be used independent of the underlying technology and the invention is not intended to be limited to a specific API.

While indexing is occurring, a user may issue query in step 736A. Here, the response (732B) return includes both the data indexed in steps 734A-734C and 732A. That is, the response includes all fresh indexed content and the most recent historical indexed content.

Backlog processor continues to index the second most recent time period in step 732B while the fresh indexer indexes newly received fresh content in step 734D.

Another query is issued in 736B. Similar to response 732A, the response 732B includes all responsive data indexed in 732A-732B and 734A-734D.

Ultimately, backlog indexer indexes the third, and final in this example, backlog job in step 732C. At this point, all historical content has been indexed and the backlog indexer indicates to the administrator that the backlog processing jobs are complete in step 740. Additionally, another set of fresh, real-time data may be indexed as well in step 734F.

At this point, a third query 736C is issued to the content index. At this point, the content index has fully indexed all historical content and fresh content as well. Thus, response 738C comprises a full set of indexed items responsive to the query 736C.

As a final note, fresh indexer may continue to index incoming fresh content as indicated by update 734G. At this point, all queries and responses after the backlog has been fully processed may return the full set of documents.

FIG. 8 is a screen diagram illustrating a user interface for accessing a personal search system according to some embodiments of the disclosure.

The screen diagram in FIG. 8 illustrates a personal search system as implemented in a web-based mail application. In the illustrated diagram, a search box 802 is included within the web page 800. A user may enter keywords in search box 802 and click the search button to issue a query to the described content index.

As described above, the mail system may implement personal search at any time. When the personal search system is implemented a historical backlog of email messages exists to be processed. Additionally, new messages are being received in parallel. These two data sources correspond to the historical and fresh data described previously.

In response to a query entered in search box 802, the web page 800 displays a plurality of search results. As one example, the web page displays a derived document 804. As described previously, derived documents correspond to content within a document (e.g., an email). The derived document 804 may be reformatted according to a derived document definition. Specifically, the data fields within derived document 804 (e.g., flight number, departure time, arrival time, etc.) may comprise, partially, contents of the underlying email. Additionally, in some embodiments, the system extracts additional items from remote sources based on data within the email. For example, the gate number may be retrieved dynamically based on the flight number in the email.

In addition to derived document 804, other tabs 810 may allow for views of additional derived document types. As described above, documents stored in content index may be assigned a type based on various factors. For example, documents may be extracted from email messages if they are attachments of a certain type. Similarly, photos may be extracted from email messages as well as web links, cards, or contact details.

In addition to displaying derived documents, the web page 800 displays search results 808A and 808B. As illustrated in web page 800, search results may be group based on time (e.g., corresponding to historical backlog processing jobs). As described previously each of the email messages in 808A and 808B corresponds to a document indexed in the content index.

Figure 9:
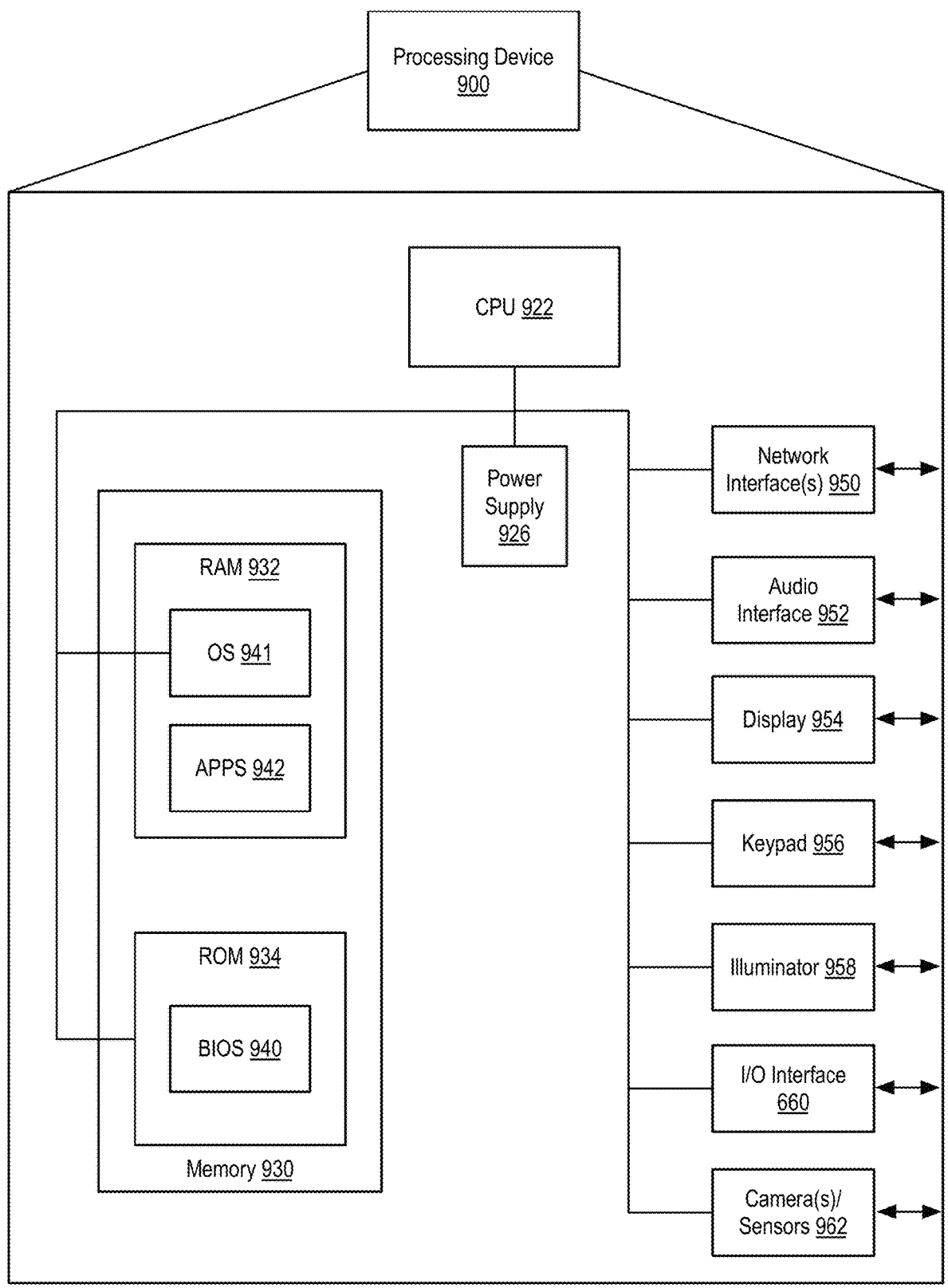
FIG. 9 is a block diagram of a processing device according to some embodiments of the disclosure.

FIG. 9 is a block diagram of a processing device according to some embodiments of the disclosure.

Processing device 900 may include many more or less components than those shown in FIG. 9. However, the components shown are sufficient to disclose an illustrative embodiment for implementing the previously disclosed embodiments. Processing device 900 may represent, for example, processing devices discussed above in relation to FIGS. 1 and 2.

As shown in FIG. 9, processing device 900 includes a processing unit (CPU) 922 in communication with a mass memory 930 via a bus 924. Processing device 900 also includes a power supply 926, one or more network interfaces 950, an audio interface 952, a display 954, a keypad 956, an illuminator 958, an input/output interface 960, and a camera (s) or other optical, thermal or electromagnetic sensors 962. Processing device 900 can include one camera/sensor 962, or a plurality of cameras/sensors 962, as understood by those of skill in the art.

Power supply 926 provides power to processing device 900. A rechargeable or non-rechargeable battery may be used to provide power. The power may also be provided by an external power source, such as an AC adapter or a powered docking cradle that supplements and/or recharges a battery.

Processing device 900 may optionally communicate with a base station (not shown), or directly with another computing device. Network interface 950 includes circuitry for coupling processing device 900 to one or more networks, and is constructed for use with one or more communication protocols and technologies. Network interface 950 is sometimes known as a transceiver, transceiving device, or network interface card (NIC).

Audio interface 952 is arranged to produce and receive audio signals such as the sound of a human voice. For example, audio interface 952 may be coupled to a speaker and microphone (not shown) to enable telecommunication with others and/or generate an audio acknowledgement for some action. Display 954 may be a liquid crystal display (LCD), gas plasma, light emitting diode (LED), or any other type of display used with a computing device. Display 954 may also include a touch sensitive screen arranged to receive input from an object such as a stylus or a digit from a human hand.

Keypad 956 may comprise any input device arranged to receive input from a user. For example, keypad 956 may include a push button numeric dial, or a keyboard. Keypad 956 may also include command buttons that are associated with selecting and sending images. Illuminator 958 may provide a status indication and/or provide light. Illuminator 958 may remain active for specific periods of time or in response to events. For example, when illuminator 958 is active, it may backlight the buttons on keypad 956 and stay on while the processing device is powered. Also, illuminator 958 may backlight these buttons in various patterns when particular actions are performed, such as dialing another client device. Illuminator 958 may also cause light sources positioned within a transparent or translucent case of a client device to illuminate in response to actions.

Processing device 900 also comprises input/output interface 960 for communicating with external devices, such as content or event indexes, search middleware, external data sources, or other input or devices not shown in FIG. 9. Input/output interface 960 can utilize one or more communication technologies, such as USB, infrared, Bluetooth™, or the like.

Mass memory 930 includes a RAM 932, a ROM 934, and other storage means. Mass memory 930 illustrates another example of computer storage media for storage of information such as computer readable instructions, data structures, program modules or other data. Mass memory 930 stores a basic input/output system ("BIOS") 940 for controlling low-level operation of processing device 900. The mass memory also stores an operating system 941 for controlling the operation of processing device 900. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 930 further includes one or more data stores, which can be utilized by processing device 900 to store, among other things, applications 942 and/or other data. For example, data stores may be employed to store information that describes various capabilities of processing device 900. The information may then be provided to another device based on any of a variety of events, including being sent as part of a header during a communication, sent upon request, or the like. At least a portion of the capability information may also be stored on a disk drive or other storage medium (not shown) within processing device 900.

Applications 942 may include computer executable instructions which, when executed by processing device 900, enable the transfer of data between processing device 900 and other devices. When implemented as a processor (e.g., bulk or real-time) the applications 942 may perform the operations described in connection with FIGS. 4-5 and related operations. Alternatively, when implemented as a consumer device, the applications 942 may include a browser application or custom application issuing queries to the system described in connection with FIGS. 1-2. Generally, each of the components described in connection with FIGS. 1-2 may be implemented as the device 900.

In some embodiments, the device 900 may include more or fewer components than illustrated in FIG. 9. For example, a server-side processing device may not include audio interface 952, display 954, keypad 956, illuminator 958, or cameras/sensors 962. Additionally, in virtualized environments device 900 may only logically include CPU 922, memory 930, RAM 932, OS 941, applications 942, network interfaces 950 and input/output interface 660.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   initiating indexing of historic content and real-time content at a first time point, the historic content comprising content items stored prior to the first time point and the real-time content comprising content items received after the first time point;
   executing backlog jobs in parallel with real-time processing jobs, the backlog jobs indexing the historic content in a content index and the real-time processing jobs indexing the real-time content in the content index, wherein executing the backlog jobs comprises processing batches of the historic content beginning at an initial time point and terminating at the first time point, the initial time point occurring before the first time point;
   receiving a query from a client device, the query received during execution of the backlog and real-time processing jobs;
   returning a partially responsive result to the client device, the partially responsive result based on a current state of the backlog jobs.

2. The method of claim 1, wherein executing the backlog jobs comprises processing batches of the historic content beginning at the first time point and terminating at an initial time point, the initial time point occurring before the first time point.

3. The method of claim 1, wherein indexing the real-time content comprises performing an atomic update of an index for the real-time content.

4. The method of claim 1, further comprising:
   receiving a second query from the client device after the backlog jobs have completed; and
   returning a full result to the client device, the full result comprising all responsive items in the historic content and real-time content.

5. The method of claim 1, wherein returning the partially responsive result comprises returning all responsive results from the real-time content and at least one responsive result from the historic content.

6. The method of claim 1, further comprising updating a historic content item in the content index based on the real-time processing jobs.

7. A non-transitory computer-readable storage medium for tangibly storing computer program instructions capable of being executed by a computer processor, the computer program instructions defining the steps of:
   initiating indexing of historic content and real-time content at a first time point, the historic content comprising content items stored prior to the first time point and the real-time content comprising content items received after the first time point;
   executing backlog jobs in parallel with real-time processing jobs, the backlog jobs indexing the historic content in a content index and the real-time processing jobs indexing the real-time content in the content index, wherein executing the backlog jobs comprises processing batches of the historic content beginning at an initial time point and terminating at the first time point, the initial time point occurring before the first time point;
   receiving a query from a client device, the query received during execution of the backlog and real-time processing jobs;
   returning a partially responsive result to the client device, the partially responsive result based on a current state of the backlog jobs.

8. The computer-readable storage of claim 7, wherein executing the backlog jobs comprises processing batches of the historic content beginning at the first time point and terminating at an initial time point, the initial time point occurring before the first time point.

9. The computer-readable storage of claim 7, wherein indexing the real-time content comprises performing an atomic update of an index for the real-time content.

10. The computer-readable storage of claim 7, further comprising:
    receiving a second query from the client device after the backlog jobs have completed; and
    returning a full result to the client device, the full result comprising all responsive items in the historic content and real-time content.

11. The computer-readable storage of claim 7, wherein returning the partially responsive result comprises returning all responsive results from the real-time content and at least one responsive result from the historic content.

12. The computer-readable storage of claim 7, further comprising updating a historic content item in the content index based on the real-time processing jobs.

13. A device comprising:
    a processor; and
    a storage medium for tangibly storing thereon program logic for execution by the processor, the stored program logic comprising:
    logic, executed by the processor, for initiating indexing of historic content and real-time content at a first time point, the historic content comprising content items stored prior to the first time point and the real-time content comprising content items received after the first time point;

logic, executed by the processor, for executing backlog jobs in parallel with real-time processing jobs, the backlog jobs indexing the historic content in a content index and the real-time processing jobs indexing the real-time content in the content index, wherein executing the backlog jobs comprises processing batches of the historic content beginning at an initial time point and terminating at the first time point, the initial time point occurring before the first time point;

logic, executed by the processor, for receiving a query from a client device, the query received during execution of the backlog and real-time processing jobs;

logic, executed by the processor, for returning a partially responsive result to the client device, the partially responsive result based on a current state of the backlog jobs.

14. The device of claim 13, wherein executing the backlog jobs comprises processing batches of the historic content beginning at the first time point and terminating at an initial time point, the initial time point occurring before the first time point.

15. The device of claim 13, wherein indexing the real-time content comprises performing an atomic update of an index for the real-time content.

16. The device of claim 13, the stored program logic further comprising:
   logic, executed by the processor, for receiving a second query from the client device after the backlog jobs have completed; and
   logic, executed by the processor, for returning a full result to the client device, the full result comprising all responsive items in the historic content and real-time content.

17. The device of claim 13, wherein returning the partially responsive result comprises returning all responsive results from the real-time content and at least one responsive result from the historic content.

* * * * *